United States Patent

Propst

[15] 3,651,845
[45] Mar. 28, 1972

[54] METHOD AND APPARATUS FOR CONVERTING TREES INTO WOOD CHIPS

[72] Inventor: Robert L. Propst, 2347 Londonderry Avenue, Ann Arbor, Mich. 48105

[22] Filed: May 25, 1970

[21] Appl. No.: 40,998

[52] U.S. Cl. .................................144/3 D, 144/309 AC
[51] Int. Cl. ...............................................A01g 23/02
[58] Field of Search ..........144/2 Z, 3 D, 34 R, 34 E, 309 AC, 144/208 R, 208 E, 208 K, 172, 326

[56] References Cited

UNITED STATES PATENTS

| | | | |
|---|---|---|---|
| 3,394,744 | 7/1968 | Vit | 144/172 X |
| 3,356,116 | 12/1967 | Brundell et al. | 144/326 |
| 3,533,458 | 10/1970 | McColl | 144/309 AC |
| 2,583,971 | 1/1952 | Shuff | 144/208 K |
| 3,285,305 | 11/1966 | Nicholson | 144/208 R |

*Primary Examiner*—Gerald A. Dost
*Attorney*—Olsen and Stephenson

[57] ABSTRACT

The method and apparatus for converting small trees into wood chips suitable for use in the pulp wood industry comprising combining a tree felling mechanism and a chipper mechanism in a single vehicle. The chipper mechanism consists of a rotatable toothed member movable into engagement with a tree so as to sever the tree and a tree gripping and feeding mechanism disposed above the chipper mechanism operates to continuously feed the felled tree downwardly into the chipper mechanism where the tree is converted into wood chips. A conveyor assembly associated with the chipper mechanism moves the chips into a receptacle on the vehicle.

2 Claims, 3 Drawing Figures

PATENTED MAR 28 1972
3,651,845
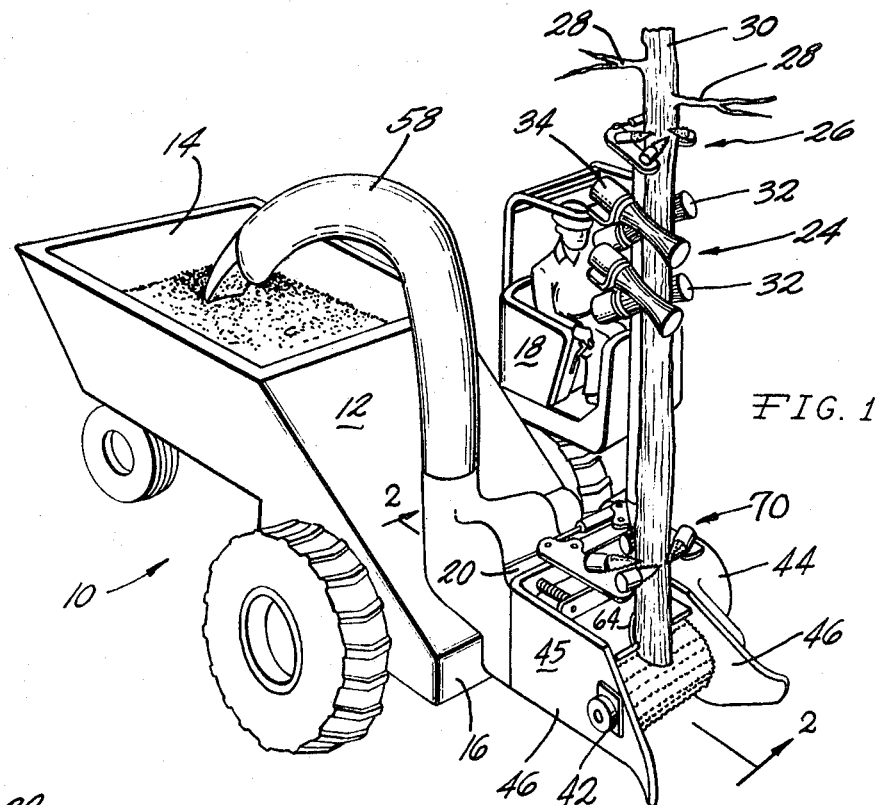
FIG. 1
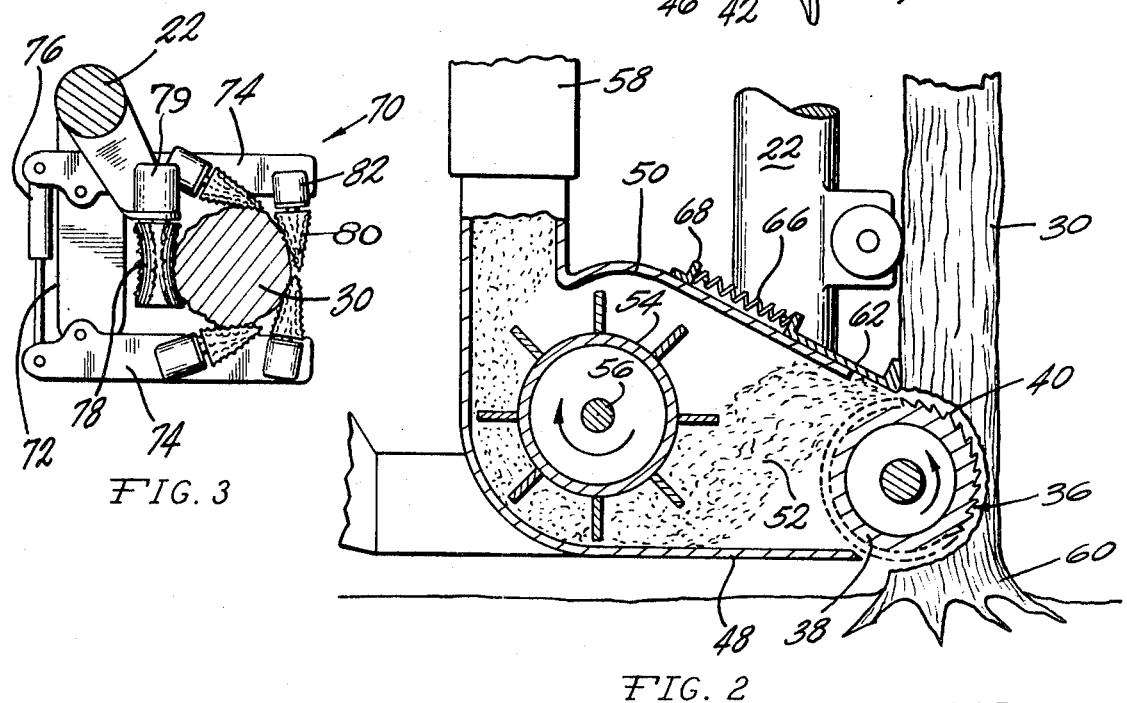
FIG. 3
FIG. 2
INVENTOR
ROBERT L. PROPST
BY Olsen and Stephenson
ATTORNEYS

METHOD AND APPARATUS FOR CONVERTING TREES INTO WOOD CHIPS

CROSS-REFERENCE TO RELATED APPLICATION

This application relates generally to tree harvesting apparatus of the type disclosed in my prior copending application Ser. No. 29,109 filed Apr. 16, 1970.

BACKGROUND OF THE INVENTION

A tree which is to be used in the pulp wood industry can be processed by several different methods. One method involves cutting the tree and transporting the full length tree for some distance to a location where it can be delimbed and cut to length or in some cases debarked and put into chip form. In another method, the tree is felled and then cut into 5 or 10-foot bolts for collection and transport out of the woods. The bolts are then transported to the pulp mill before they are further processed into chip form. The method and apparatus of this invention is advantageous because it provides for processing of the tree into chip form as soon as the three is severed or felled and as part of the harvesting process. Thus, in the method and apparatus of this invention, the tree is converted into the desired end product, namely, wood chips, during harvesting of the tree. As a result, subsequent processing steps usually required between tree harvesting and use of the wood chips in the pulp wood industry are eliminated.

SUMMARY OF THE INVENTION

The present invention consists of a forwardly movable vehicle equipped on its forward end with an upright mast which carries tree gripping and feeding rollers and a tree delimbing mechanism. The vehicle is driven forwardly to engage the gripping and feeding rollers with a tree to be harvested and simultaneously with this engagement, a chipping mechanism, consisting of a rotatable toothed member disposed below the gripping and feeding rollers, is moved into engagement with the tree so as to sever the tree and convert the severed portion of the tree into wood chips. Immediately upon severing of the tree, the tree gripping and feeding rollers operate to move the severed tree downwardly so that the lower end portion thereof is continuously fed into the chipper mechanism and converted into wood chips. A housing associated with the chipper mechanism is located so as to receive the wood chips and an impeller in the housing operates in conjunction with a tubular spout to direct the wood chips into a receptacle on the vehicle. Thus, the vehicle can move continuously through the woods so as to convert the trees to be harvested therein into wood chips which are usable directly by the pulp wood industry.

The principal object of this invention, therefore, is to provide an improved method and apparatus for immediately converting trees to wood chips.

Further objects, features and advantages of this invention will become apparent from a consideration of the following description, the appended claims, and the accompanying drawing in which:

FIG. 1 is a perspective view of the apparatus of this invention shown in position to harvest a tree;

FIG. 2 is an enlarged fragmentary sectional view of a portion of the apparatus of this invention as seen from the line 2—2 in FIG. 1; and FIG. 3 is a plan view of the debarking assembly in the apparatus of this invention shown in operative position relative to a tree.

With reference to the drawing, the apparatus of this invention, indicated generally at 10, is illustrated in FIG. 1 as including a forwardly movable vehicle 12 having a wood chip storage receptacle 14 and having a front end 16. The vehicle 12 also includes a cab 18 located at the front end of the vehicle at an elevated position from which the vehicle operator can steer the vehicle 12 and manipulate other components of the apparatus 10 with good visibility of tree harvesting operations. The apparatus 10 also includes a frame 20 located on the forward end 16 of the vehicle and an upright mast 22 mounted on the frame 20. A tree gripping and feeding assembly 24 is mounted on the mast 22 at a position below a tree delimbing assembly 26 capable of removing limbs such as those indicated at 28 on the tree 30 illustrated in the process of being converted to wood chips in FIG. 1. The assemblies 24 and 26 are described in detail in the aforementioned copending application and accordingly such detailed description is omitted here. The assembly 24 includes rollers 32 arranged in pairs and driven by motors 34 so that they are capable of gripping the tree 30 and continuously moving the tree 30 in a downward direction.

A chipper mechanism 36, consisting of a cylindrical member 38 having external teeth 40, is mounted on the frame 20 below the tree gripping and feeding assembly 24. The toothed member 38 is mounted on a shaft 42 which is substantially horizontal and which is driven by a motor 44 so that the member 38 is continuously rotated in a counterclockwise direction as viewed in FIG. 2. A housing 45 having side walls 46, a bottom wall 48 and a top wall 50 partially encloses the chipper mechanism 36 and is positioned rearwardly of the mechanism 36 so as to receive wood chips, indicated at 52, therefrom. A vaned impeller 54, mounted on a shaft 56 and driven by the motor 44, is positioned in the housing 45 for moving wood chips therefrom into a tubular spout 58 which empties into the receptacle 14 for depositing wood chips therein.

A debarking assembly 70 (FIG. 3) is mounted on the mast 22 at a position between the tree gripping and feeding assembly 24 and the chipper mechanism 36 for removing bark from the tree 30 prior to conversion of the tree into wood chips. The assembly 70 consists of a support plate 72 secured to the mast 22 and a pair of arms 74 pivotally mounted on the plate 72 and connected to a hydraulic cylinder assembly 76 capable of swinging the arms 74 toward and away from each other. A fixed position debarker hog 78 is secured to the mast 22 and has a roughened surface engageable with the tree 30 for removing bark therefrom in response to rotation of the hog 78 by a drive motor 79. A plurality of conical hogs 80 are mounted on the arms 74 and are driven by motors 82 also for removing bark from the tree 30. When the cylinder assembly 76 is retracted the hogs 80 are moved to positions in clearance relation with a tree 30 to be processed and when the cylinder assembly 76 is extended, as shown in FIG. 3, the hogs 80 are moved into engagement with the tree surface under the resilient pressure of the fluid in the cylinder assembly 76 so that the hogs 80 can follow the contour of the tree surface.

In the operation of the apparatus 10, the operator of the vehicle 12 drives the vehicle forwardly to a position in which the tree gripping and feeding assembly 24 engages the tree 30 and simultaneously therewith the chipper mechanism 36 engages the tree 30 at a position adjacent the tree base 60 so as to sever the tree as shown in FIG. 2, in response to forward movement of the vehicle 12. As the chipper mechanism 36 is severing the tree 30, it converts the severed portion of the tree into wood chips 52 and moves the chips 52 into the housing 45. A chip shield 62, having an arcuate front end portion 64 is slidably mounted on the top side 50 of the housing 45 and is continuously urged forwardly by springs 66 extended between the shield 62 and a flange 68 on the housing 45. Thus, the springs 66 act to maintain the arcuate front edge 64 of the shield 62 in engagement with the tree 30 and prevent escape of wood chips through the top side of the housing 45.

As soon as the tree 30 has been severed by the chipper mechanism 36, the tree gripping and feeding assembly 24 operates to feed the tree 30 downwardly past the debarking assembly 70 and into the chipper mechanism 36 which functions continuously to break up the lower end of the tree 30 into wood chips 52 and throw the wood chips 52 into the housing 45. The impeller 54 then operates to continuously convey the wood chips 52 through the spout 58 and into the receptacle 14 which is periodically emptied. The assembly 24 functions to also rotate the tree 30 to some extent during its downward travel so that as the tree moves past the debarking assembly 70 the entire tree surface is subjected to the action of the hogs 78 and 80 which function to remove the tree bark prior to conversion of the tree into the chips 52.

From the above description it is seen that this invention provides an improved method and apparatus for immediately converting standing trees into wood chips and storing these chips in the receptacle 14. This enables transport of the chips directly to the desired pulp wood processing plant for use by the pulp wood industry.

I claim:

1. Apparatus for converting a standing tree into wood chips comprising a forwardly movable vehicle, a toothed member rotatably mounted in a fixed position on the forward end of said vehicle for rotation about a substantially horizontal axis, said toothed member being engageable with a standing tree adjacent the base thereof for severing said tree, said toothed member being operable on engagement with said tree to convert said tree into wood chips, housing means on said vehicle disposed rearwardly of and partially enclosing said toothed member for receiving wood chips therefrom, and means on the forward end of said vehicle disposed above said toothed member for gripping said severed tree and feeding said tree downwardly into engagement with said toothed member for operation of said toothed member to convert said tree into wood chips.

2. Apparatus according to claim 1 further including receptacle means on said vehicle, conveyor means extending between said housing means and said receptacle means for moving said wood chips from said housing means to said receptacle means, and rotatable impeller means in said housing means rearwardly of said toothed member for moving wood chips therein into said conveyor means.

* * * * *